United States Patent
Hung et al.

(10) Patent No.: US 8,666,153 B2
(45) Date of Patent: *Mar. 4, 2014

(54) IMAGE INPUT APPARATUS

(75) Inventors: Po-Chieh Hung, Hachioji (JP); Jun Takayama, Tama (JP); Koichi Kamon, Kyoto (JP); Sei Koh, Hachioji (JP)

(73) Assignee: Konica Minolta Opto, Inc. (JP)

( * ) Notice: Subject to any disclaimer, the term of this patent is extended or adjusted under 35 U.S.C. 154(b) by 336 days.

This patent is subject to a terminal disclaimer.

(21) Appl. No.: 13/125,930

(22) PCT Filed: Oct. 28, 2009

(86) PCT No.: PCT/JP2009/068480
§ 371 (c)(1),
(2), (4) Date: Apr. 25, 2011

(87) PCT Pub. No.: WO2010/053029
PCT Pub. Date: May 14, 2010

(65) Prior Publication Data
US 2011/0243430 A1     Oct. 6, 2011

(30) Foreign Application Priority Data
Nov. 4, 2008 (JP) .................. 2008-283744

(51) Int. Cl.
*G06K 9/00* (2006.01)
(52) U.S. Cl.
USPC ........................................ 382/162
(58) Field of Classification Search
USPC ............... 382/162–167; 358/1.9, 518; 348/277–280, 269, 294, 222.1–223.1, 348/221.1, 229.1, 362–364, 208.12–208.14, 348/154–155, 271–273
See application file for complete search history.

(56) References Cited

U.S. PATENT DOCUMENTS

| | | | | |
|---|---|---|---|---|
| 6,801,248 B1 * | 10/2004 | Horiuchi | ................. | 348/208.13 |
| 7,274,393 B2 * | 9/2007 | Acharya | ..................... | 348/273 |
| 7,864,233 B2 * | 1/2011 | Kwon et al. | ................. | 348/272 |
| 8,339,489 B2 * | 12/2012 | Choe et al. | .................... | 348/276 |
| 8,411,176 B2 * | 4/2013 | Katagiri et al. | ............... | 348/278 |

(Continued)

FOREIGN PATENT DOCUMENTS

| CN | 101188775 A | 5/2008 |
|---|---|---|
| CN | 101309428 A | 11/2008 |

(Continued)

OTHER PUBLICATIONS

Extended European Search Report for Application No./Patent No. 09824729.9-2202/2343904, dated Aug. 6, 2012, with English translation.

(Continued)

*Primary Examiner* — Ishrat I Sherali
(74) *Attorney, Agent, or Firm* — Cantor Colburn LLP

(57) ABSTRACT

Provided is an image inputting apparatus wherein luminance signals having a high S/N ratio can be generated even during nighttime with a small quantity of photons. An imaging element images image components. A color signal generating section generates color signals from the image components. A color space conversion section converts the color signals into a color space that includes luminance signals and color difference signals. The color space conversion section calculates a luminance signal obtained by adding the image components, as the luminance signal of the color space to be converted.

10 Claims, 9 Drawing Sheets

(56) References Cited

U.S. PATENT DOCUMENTS

| | | |
|---|---|---|
| 2005/0025356 A1 | 2/2005 | Fukuda |
| 2005/0133690 A1 | 6/2005 | Higashitsutsumi |
| 2008/0165397 A1 | 7/2008 | Lin |

FOREIGN PATENT DOCUMENTS

| | | | |
|---|---|---|---|
| EP | 0753725 A2 | 1/1997 | |
| JP | 2002-142228 * | 5/2002 | ............ G03B 11/00 |
| JP | 2002-142228 A | 5/2002 | |
| JP | 2005-184690 A | 7/2005 | |
| JP | 2007-134968 A | 5/2007 | |
| JP | 2007-184805 A | 7/2007 | |
| JP | 2008-289001 A | 11/2008 | |
| KR | 10-2008-0101770 A | 11/2008 | |
| TW | 1249950 B | 2/2006 | |

OTHER PUBLICATIONS

International Search Report for International Application No. PCT/JP2009/068480 mailed Dec. 22, 2009 with English translation.

The First Office Action for Chinese Application No. 200980142922.3; Mailing Date: Apr. 15, 2013, with English Translation.

\* cited by examiner

| R | W | R | W |
|---|---|---|---|
| IR | Ye | IR | Ye |
| R | W | R | W |
| IR | Ye | IR | Ye |

31

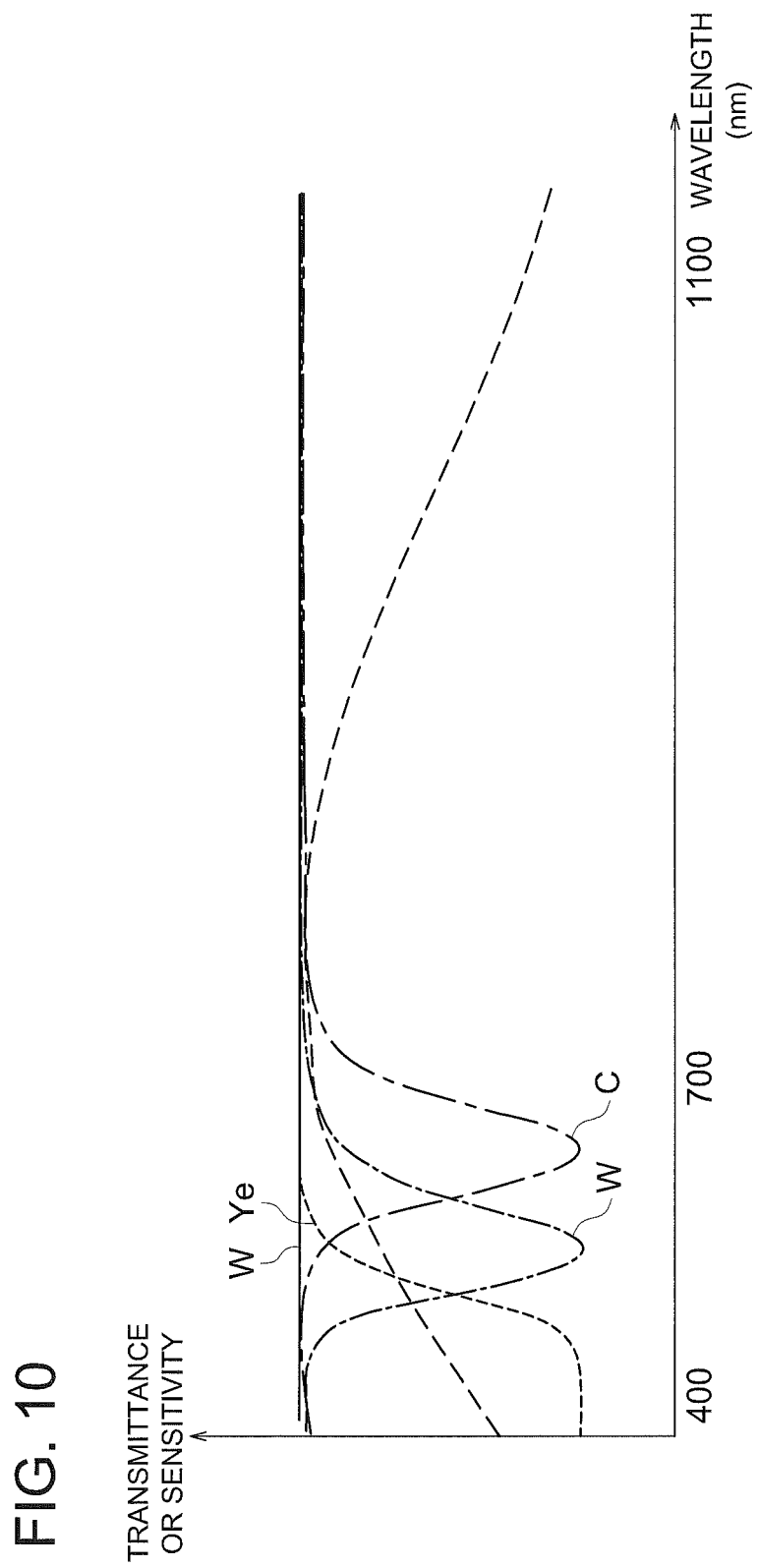

IMAGE INPUT APPARATUS

This is a U.S. national stage application of International Application No. PCT/JP2009/068480, filed on Oct. 28, 2010. Priority under 35 U.S.C. 119(a) and 35 U.S.C. 365(b) is claimed from Japanese Application No. 2008-283744, filed Nov. 4, 2008, the disclosure of which is also incorporated herein by reference.

TECHNICAL FIELD

The present invention relates to an image input apparatus which processes data of an original image taken by imaging elements.

BACKGROUND TECHNOLOGY

In recent years, there has been known an imaging device taking a night scene in color. For example, Patent Document 1 discloses a color image reproducing device as described below. First, visual image data comprising R, G, and B color components are extracted from an image which was taken by pixels having R, G, and B filters. Next, infrared image data are extracted from an image which was taken by a pixel having an IR filter. Subsequently, the first luminance information is extracted after visual image data are subjected to an HSV conversion, and at the same time, the second luminance information is extracted from infrared image data. Finally, the first luminance information is weighed by weighting factor W1, and the second luminance information is weighed by weighting factor W2 (wherein, W1+W2=1), to generate a pseudocolor image.

PRIOR ARTS

Patent Document

Patent Document 1: Japanese Patent Application Publication No. 2007-184805

SUMMARY OF THE INVENTION

Issues to be Solved by the Invention

Since the amount of photons is small at night, there is a problem that an S/N ratio of an image becomes small, but, in the method of Patent Document 1, such problem is not taken into account.

The purpose of the present invention is to provide an image input apparatus which can generate luminance signals having a high S/N ratio of an image even at night when the amount of photons is small.

Measures to Solve the Issues (1) An image input apparatus of an aspect of the present invention is arranged with at least three kinds of pixels having different spectral sensitivities, and is provided with imaging elements which take original image data containing at least three kinds of original image components, and a color space conversion section which converts the above original image data into a color space including luminance signals and color signals, wherein the above color space conversion section calculates the first intensity signals, which can be obtained by carrying out an addition processing of the above original image components, as luminous signals of the above color space.

According to the above constitution, the original data containing at least three kinds of original image components are taken by the imaging elements. Then, the color space conversion section generates the first intensity signals by carrying out an addition processing of the original image components which constitute the original image data, and calculates the first intensity image signals as luminous signals of color space. Therefore, even at night when the amount of photons is small, luminance signals having a high S/N ratio can be generated.

(2) The above color space conversion section preferably carries out smoothing processing with respect to the above original image components or chromaticity signals based on the above original image components.

According to the above constitution, the smoothing processing with respect to the above original image components or chromaticity signals based on the above original image components is carried out. Therefore, chromaticity signals having a high S/N ratio can be obtained.

(3) It is preferable that a color signal generating section which generates RGB color signals from the above original image components is further provided, and the above color space conversion section generates the second intensity signals by converting the above RGB signals into the above color space, and calculates the chromaticity signals of the above color space by carrying out a mathematical operation using the first ratio, a ratio of the above first intensity signals to the above second intensity signals.

According to the above constitution, by carrying out a color conversion of the RGB color signals, the second intensity signals are generated. The ratio of the first intensity signals to the second intensity signals is calculated as the first ratio. Then, the chromaticity signals of the color space are calculated by carrying out a mathematical operation using the first ratio. Therefore, the color space conversion section can generate chromaticity signals and luminance signals, both of which are well balanced in the color space which is subject to conversion.

(4) It is preferable that a color signal generating section which generates RGB color signals from the above original image components is further provided, and the above color space conversion section generates the above second intensity signals by converting the above RGB color signals into the above color space, and corrects the above first intensity signals by carrying out a mathematical operation using the second ratio, a ratio of the above second intensity signals which was subjected to a smoothing processing to the above first intensity signals which was subjected to a smoothing processing, to calculate the corrected first intensity signals as luminous signals of the above color space.

According to the above constitution, the first intensity signals are corrected by carrying out a mathematical operation using the second ratio, a ratio of the above second intensity signals having been subjected to a smoothing processing to the above first intensity signals having been subjected to a smoothing processing. Therefore, luminous signals, which reproduced, with high accuracy, intensity of an image visually confirmed by people, can be generated.

(5) It is preferable that the above color space conversion section generates the above second intensity signals by converting the above RGB color signals into the above color space, and calculates chromaticity signals of the above color space by carrying out a mathematical operation using the first ratio, a ratio of the above first intensity signals to the above second intensity signals.

According to the above constitution, chromaticity signals of a color space are corrected by carrying out a mathematical operation using the first ratio. Therefore, a balance between intensity signals and color signals in a color space which is subject to conversion can be maintained.

(6) It is preferable that the above original image data contains infrared image components, and then, the above color space conversion section compares the intensity of infrared light with the intensity of visible light based on the above infrared image components, and performs a weighted addition of the above first intensity signals and signals in which the above original image components were used with no change, so that weighting of the above first intensity signals becomes small as the intensity of the infrared light increases, to calculate luminous signals of the above color space.

According to the above constitution, a weighted addition of the first intensity signals and signals in which the original image components were used with no change is performed so that weighting of the first intensity signals becomes small as the intensity of infrared light becomes stronger than the intensity of visible light, and then, luminous signals of the color space which is subject to conversion are calculated. Therefore, luminous signals, which indicate, with high accuracy, intensity of an image viewed by people, can be generated.

(7) The above color space conversion section is preferably calculated so that the chromaticity signals of the above color space decreases as the intensity of infrared light becomes stronger than the intensity of visible light.

According to the above constitution, the stronger the intensity of infrared light than the intensity of visible light, the higher the possibility that pictures were taken at night, and thereby the chromaticity signals may not be calculated with high accuracy. Then, by adopting the present constitution, RGB color signals can be calculated so that the chromaticity signals decrease and influence of the chromaticity signals having low calculation accuracy becomes low.

(8) It is preferable that further provided are a smoothing processing section which carries out a smoothing processing of the above original image components, a color interpolation section which interpolates missing pixel data of the original image components which were subjected to a smoothing processing by the above smoothing processing section, and a color signal generating section which generates RGB color signals from the above original image components, wherein the above color signal generating section generates the above RGB color signals from the original image components in which the missing pixel data were interpolated by the above color interpolation section.

According to the above constitution, since the smoothing processing is carried out before the interpolation processing is carried out, the circuit size of the smoothing processing section can be reduced.

(9) It is preferable that, in the above imaging elements, unit pixel parts, containing the first pixel, the second pixel, the third pixel, and the fourth pixel, all of which have different spectral sensitivity from each other, are arranged in a matrix shape, and when the visible wavelength region and the infrared wavelength region are referred to as the wavelength bands with sensitivity, the above first pixel is provided with the first color filter which transmits light of the above wavelength bands with sensitivity except for the blue region of the above visible wavelength region, the above second pixel is provided with the second color filter which transmits light of the above wavelength bands with sensitivity except for the blue and green regions of the above visible wavelength region, the above third pixel is provided with an infrared color filter which transmits light of the above wavelength bands with sensitivity except for the above visible wavelength region, and the above fourth pixel is not provided with a filter.

According to the above constitution, since the all pixels have sensitivity in the infrared wavelength region, infrared image components having a high S/N ratio can be obtained. In addition, an imaging element having excellent spectral transmission characteristics can be produced at low cost.

(10) At least one of at least three kinds of pixels having different spectral sensitivity of the above imaging elements has preferably sensitivity in the infrared wavelength region.

(11) It is preferable that at least one of at least three kinds of pixels having different spectral sensitivity of the above imaging elements has sensitivity only in the infrared wavelength region, and the above first intensity signals are calculated only by carrying out addition processing of the original image components containing the infrared image component.

According to the above constitution, since at least one of the pixels has sensitivity in the infrared wavelength region, and the original image components containing the original image components are calculated only by carrying out addition processing without carrying out subtraction processing, an infrared image component having a high S/N ratio can be obtained. Therefore, even at night when the amount of photons is small, luminance signals having a high S/N ratio can be generated.

Effects of the Invention

According to the present invention, the first intensity signals are generated by carrying out addition processing of the original components constituting the original image data, and the first intensity signals are calculated as luminous signals of a color space which is subject to a conversion. Therefore, even at night when the amount of photons is small, luminance signals having a high S/N ratio can be generated.

Further, in the case where, after the RGB color signals are subjected to a color space conversion, the chromaticity signals of the color space are calculated by carrying out the smoothing processing, even at night when the amount of photons is further small, luminance signals having a high S/N ratio can be generated.

BRIEF DESCRIPTION OF THE DRAWINGS

FIG. 2 is a figure showing an arrangement of pixels of an imaging element.

FIG. 10 is a figure showing spectral sensitivity characteristics of cyan and magenta.

MODE FOR CARRYING OUT THE INVENTION

Embodiment 1

Figure 1:
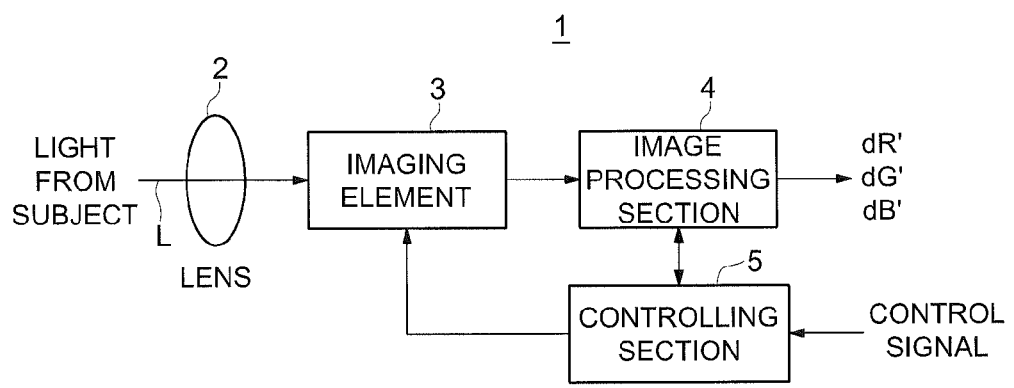
FIG. 1 shows a block diagram of image input apparatus 1 according to Embodiment 1.

Hereinafter, image input apparatus 1 according to Embodiment 1 of the present invention will be described. FIG. 1 shows a block diagram of image input apparatus 1. As shown in FIG. 1, image input apparatus 1 is provided with lens 2, imaging element 3, image processing section 4, and control section 5. Image input apparatus 1 is, for example, loaded on an automobile, and takes an image of a subject around the automobile.

Lens 2 takes in a light image of a subject, and is composed of an optical lens system which introduces the light image into imaging element 3. The optical lens system can adopt lenses, which are arranged in series along optical axis L of a light image of a subject, and the lens includes, for example, a zoom lens, a single-focus lens, and a block of lenses. In addition, lens 2 may be provided with a stop (not illustrated) to control the amount of transmitted light, a shutter (not illustrated), and the like, and in this case, under the control of control section 5, driving of the stop and the shutter is controlled.

Imaging element 3 has a light receiving part composed of a photo diode, an output circuit which outputs signals being subjected to a photoelectric conversion by the light receiving part, and a driving circuit which drives imaging element 3, and generates original image data having a level corresponding to the amount of light. Imaging element 3 can adopt various imaging sensors such as a CMOS image sensor, a VMIS image sensor, and a CCD image sensor.

In the present embodiment, imaging element 3 takes at least visible color image components by a pixel provided with a color filter, takes infrared image components by a pixel provided with an infrared filter, and takes image components containing visible image components and infrared image components by a pixel with no filter.

Image processing section 4 has a memory and the like which is used as a computing circuit and a work area of a computing circuit, converts the original image data being output from imaging element 3 into digital signals by an A/D conversion, and, carries out an image processing to be described of the resulting digital signals, after which outputs them to, for example, a memory (not illustrated) or a display device.

Control section 5 has a CPU, a memory storing a program carried out by the CPU, and the like, responds to control signals from outside, and manages the entire control of image input apparatus 1.

Figure 2:
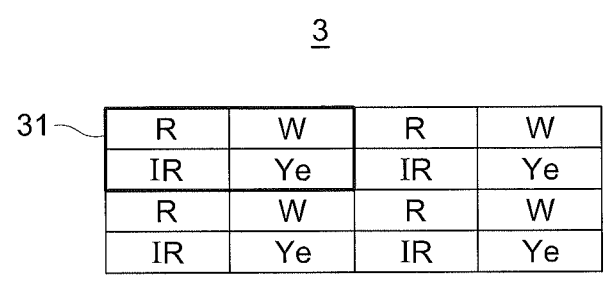

FIG. 2 is a figure showing an arrangement of pixels of imaging element 3. As shown in FIG. 2, in imaging element 3, unit pixel parts 31, containing a Ye pixel (the first pixel), an R pixel (the second pixel), an IR pixel (the third pixel), and a W pixel (the fourth pixel), are arranged in a matrix form.

In the case of FIG. 2, in unit pixel part 31, the R pixel, IR pixel, W pixel, and Ye pixel are arranged in the first row of the first line, in the first row of the second line, in the second row of the first line, and in the second row of the second line, respectively. However, this arrangement is only an example, and the R pixel, the JR pixel, the W pixel, and the Ye pixel may be arranged in other patterns.

Since the Ye pixel is provided with a Ye filter (the first color filter), the Ye pixel takes an image component Ye (an original image component), being a visible color image component of Ye, and an infrared image component. Since the R pixel is provided with an R filter (the second color filter), the R pixel takes an image component R (an original image component), being a visible color image component of R, and an infrared image component. Since the IR pixel is provided with an IR filter (an infrared filter), the IR pixel takes an image component IR (an original image component), being an infrared image component. And, since the W pixel is provided with no filter, the W pixel takes an image component W (an original image component), being an image component containing a visible image component and an image component IR.

Figure 3:
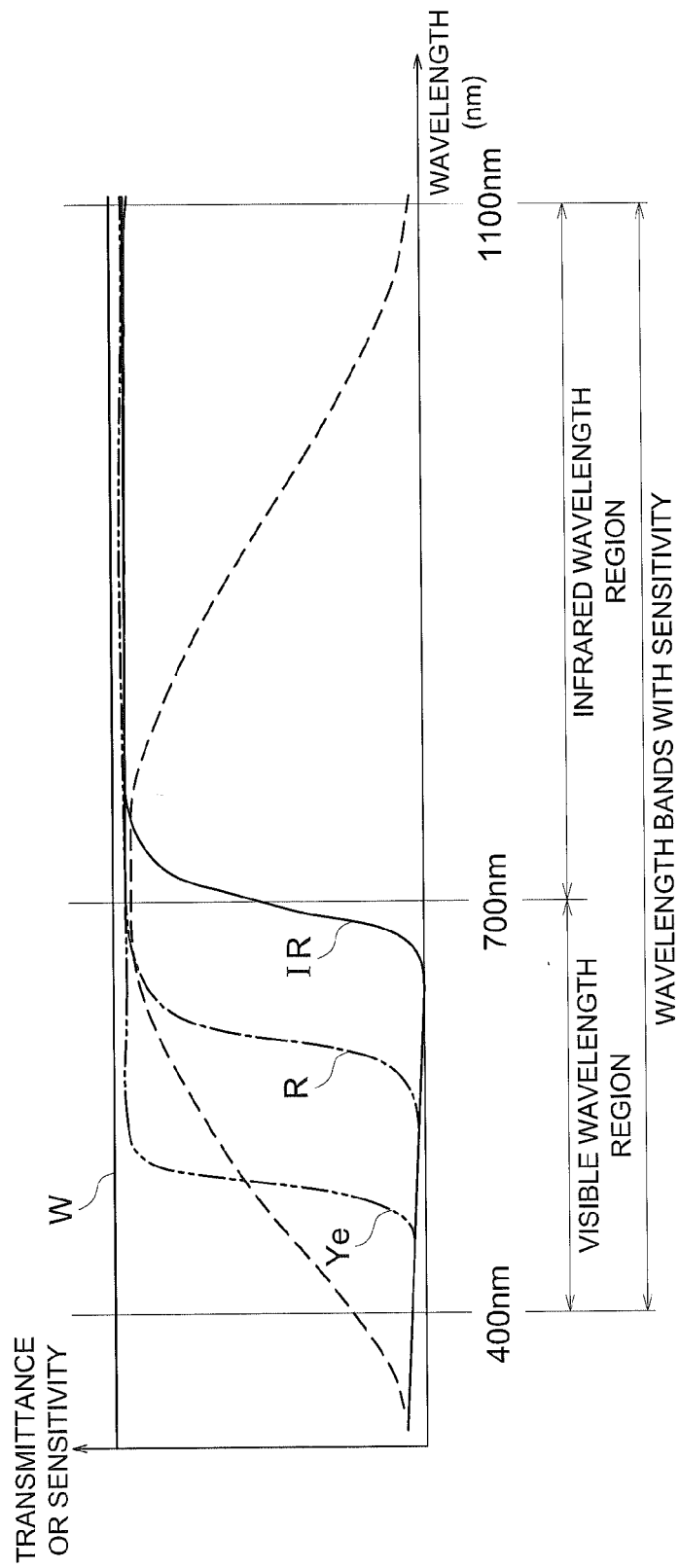
FIG. 3 is a figure showing spectral transmission characteristics of Ye, R, and IR filters.

FIG. 3 is a figure showing spectral transmission characteristics of the Ye, R, and IR filters, and the vertical axis indicates transmittance (sensitivity), and the horizontal axis indicates wavelength (nm). The dotted line of the graph shows a spectral sensitivity characteristic of a pixel in a state of a filter being removed. It is found that the dotted line of the spectral sensitivity characteristic has a peak in an infrared wavelength region, which changes while describing a convex curve. In FIG. 3, the region of 400 to 700 nm, the region of 700 to 1,100 nm, and the region of 400 to 1,100 nm are defined as a visible wavelength region, an infrared wavelength region, and a wavelength bands with sensitivity, respectively. The spectral sensitivity characteristic of a pixel in the case of having no filter has sensitivity up to the ultraviolet region, but, since the ultraviolet region is cut off by lens 2, the region of 400 to 1,100 nm becomes the wavelength bands with sensitivity. The spectral sensitivity characteristic is not limited to that shown in FIG. 3, but it may be any spectral sensitivity characteristic as long as it has sensitivity from the visible light region through the infrared region.

As shown in FIG. 3, the Ye filter has a characteristic that the filter passes through light of the above wavelength bands with sensitivity except for a blue region of the visible wavelength region. Therefore, the Ye filter passes through mainly yellow light and infrared light.

The R filter has a characteristic that the filter passes through light of the above wavelength bands with sensitivity except for the blue and green regions of the visible wavelength region. Therefore, the R filter passes through mainly the red light and infrared light.

The IR filter has a characteristic that the filter passes through light of the wavelength bands with sensitivity except for the visible wavelength region, namely light of the infrared wavelength region. The W shows the case of being provided with no filter, and it passes through all the light of the wavelength bands with sensitivity of a pixel.

To realize the other similar characteristics, it is possible to realize them even with a combination of Ye, M (magenta)+IR, and C (cyan)+IR, instead of a combination of Ye, R, and IR (however, M+IR only covers green, and C+IR only covers red). However, each of the R pixel, the IR pixel, and the Ye pixel can make the spectral transmission characteristic curve steep, and therefore, the spectral transmission characteristic is excellent compared, for example, to the (M+IR) filter or the (C+IR) filter. Namely, each of the (M+IR) and (C+IR) filters has a characteristic to cover, of the wavelength bands with sensitivity, only the green region and the red region, both of which are a part of the central region, respectively, and has a transparent wavelength region in the longer and shorter wavelength regions of the above covering wavelength region. On the other hand, since each of the R filter, the IR filter, and the Ye filter may be allowed only to have a characteristic that each filter has two adjoining wavelength regions, a covering wavelength region and a transparent wavelength region, each filter can readily has a steep spectral transmission characteristic. Therefore, each of the R filter, the IR filter, and the Ye filter can extract, with higher accuracy, RGB image components than the (M+IR) filter or the (C+IR) filter even after carrying out a mathematical operation. Therefore, by constituting imaging element 3 with the R pixel, the IR pixel, the Ye pixel, and the W pixel, high performance of imaging element 3 can be achieved.

Figure 4:
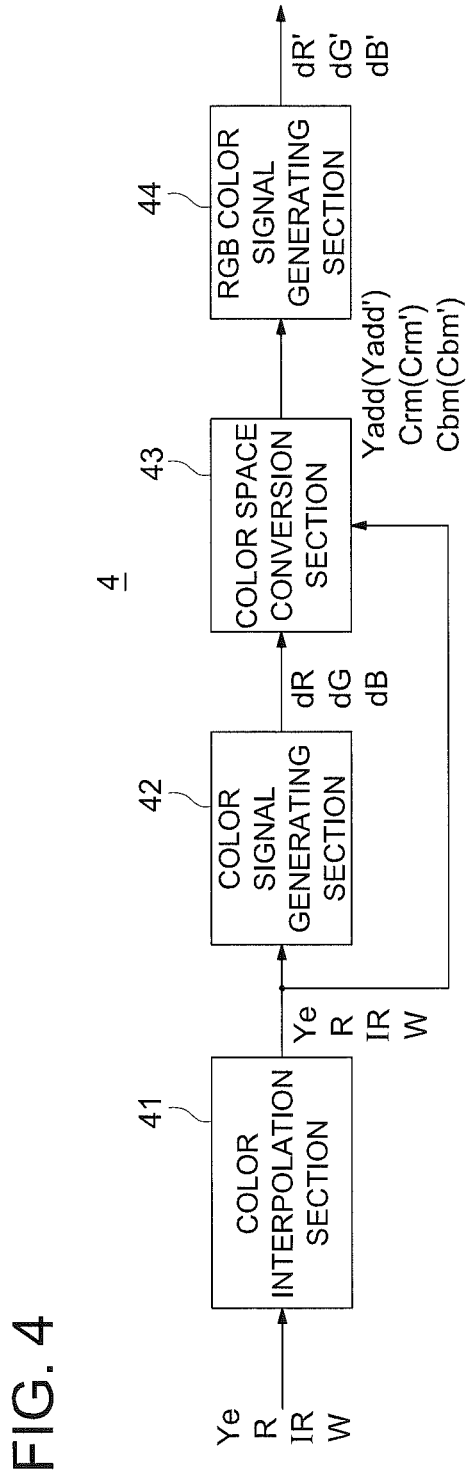
FIG. 4 is a block diagram showing a detailed constitution of an image processing section.

FIG. 4 is a block diagram showing a detailed constitution of image processing section 4. Image processing section 4 is provided with color interpolation section 41, color signal generating section 42, color space conversion section 43, and RGB color signal generating section 44.

Color interpolation section 41 performs an interpolation processing on each of an image component Ye obtained from a Ye pixel, an image component R obtained from an R pixel, an image component IR obtained from an IR pixel, and an image component W obtained from a W pixel so as to interpolate missing pixel data, and thereby converts each of the image components R, IR, W, and Ye into image data composed of the same pixel number as that of imaging element 3. The reason why missing pixel data occur on the image components Ye, R, IR, and W is due to the above-described arrangement of the R, IR, W, and Ye pixels. As the interpolation processing, for example, a linear interpolation processing may be adopted.

Color signal generation section 42 combines using Formula (1) the image components Ye, R, IR, and W, on which color interpolation section 41 performed the interpolation processing, to generate color signals dR, dG, and dB (RGB color signals).

$$dR = R - IR$$

$$dG = Ye - R, \text{ and}$$

$$dB = W - Ye \qquad \text{Formulae (1):}$$

Color space conversion section 43, as shown in Formulae (2), converts color signals dR, dG, and dB into a color space having a luminance signal Y (an example of the second intensity signal) and color difference signals Cb and Cr (an example of chromaticity signals), wherein the color difference signals Cb and Cr indicate a chromaticity signal of blue and a chromaticity signal of red, respectively.

$$Y = 0.3dR + 0.59dG + 0.11dB$$

$$Cb = dB - Y, \text{ and}$$

$$Cr = dR - Y \qquad \text{Formulae (2):}$$

Further, color space conversion section 43, as shown in Formula (3), calculates luminous signal Yadd (an example of the first intensity signal) obtained by adding image components Ye, R, IR, and W as luminous signals of a color space which is subject to conversion.

$$Yadd = (\tfrac{1}{4}) \times (R + IR + W + Ye) \qquad \text{Formula (3):}$$

Since luminous signal Yadd is calculated by addition processing, the noise component can be reduced compared to the case where the luminous signal Y is calculated by subtraction processing.

Figure 5:
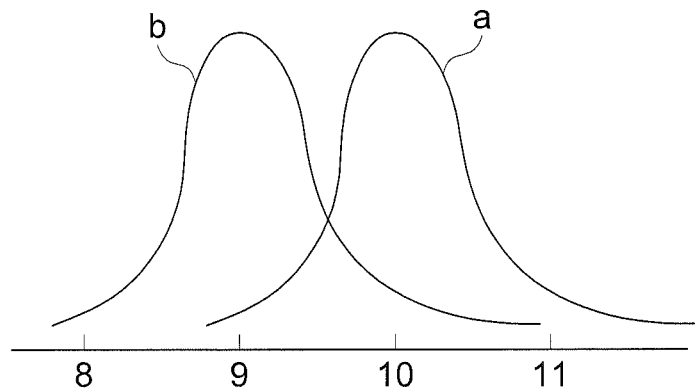
FIG. 5 is a graph showing distribution of noise components.
Figure 6A:
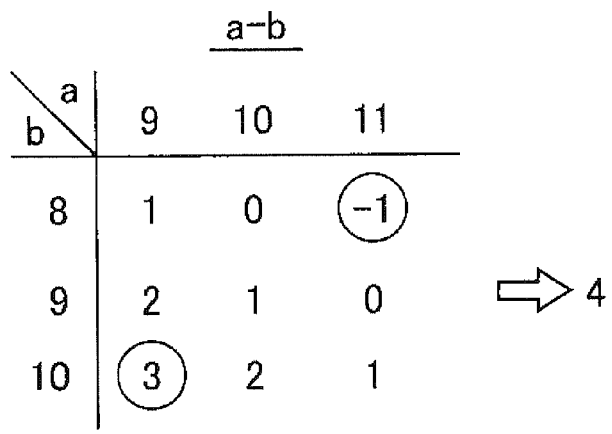
FIG. 6a is a table showing noise components which were subjected to subtraction processing.
Figure 6B:
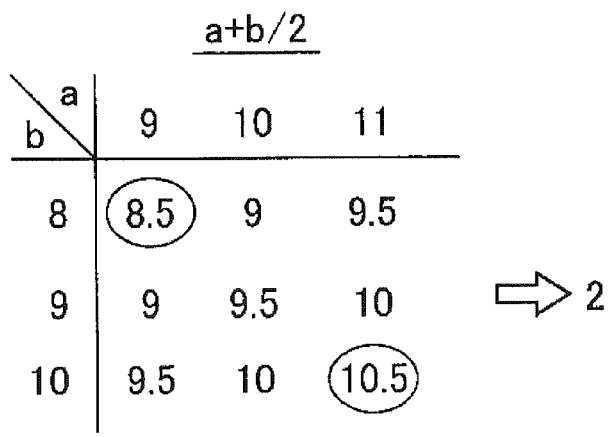
FIG. 6b is a table showing noise components which were subjected to addition processing.

FIG. 5 is a graph showing distributions of image components including noise components. FIG. 6a is a table showing output image components including noise components which were subjected to subtraction processing, and FIG. 6b is a table showing output image components including noise components which were subjected to addition processing. In FIG. 5, the vertical axis indicates frequency of image components including noise components, and the horizontal axis indicates intensity of output image components including noise components.

It is assumed that curves a and b indicate, for example, output distributions including noise components of certain image components A and B, respectively. In this FIG. 5, the output distributions a and b including noise components are assumed to have a normal distribution with the same standard distribution and with average values of for example, 10 and 9, respectively.

In an example shown in FIG. 5, if "a−b" is calculated in a simplified manner, the result of FIG. 6a is obtained. And, if "(½)×(a+b)" is calculated in a simplified manner, the result of FIG. 6b is obtained.

In the case of carrying out a subtraction processing, the maximum and minimum values of "a−b" are, as shown in FIG. 6a, 3 and −1, respectively. Then, the extent of noise component becomes 4. On the other hand, in the case of carrying out an addition processing, the maximum and minimum values of "(½)×(a+b)" are, as shown in FIG. 6b, 10.5 and 8.5, respectively, and then, the extent of noise component becomes 2. From these results, it is found that, in the case of carrying out the addition processing compared to the case of carrying out the subtraction processing, the extent of noise component becomes smaller, and thereby the S/N ratio is significantly improved. FIGS. 5 and 6 are only examples, and they do not show values of actual noise components.

Returning to FIG. 4, color space conversion section 43 carries out a smoothing processing on color-difference signals Cb and Cr, and calculates color-difference signals Cbs and Crs. As the smoothing processing, for example, a repetitive processing using a low-pass filter of a relatively small size such as, for example, 5×5 may be carried out, and then, a cascade-filter processing, which is filter processing decomposing color difference signals Cb and Cr into multiresolution, may be adopted. A filter processing using a low-pass filter having a prescribed relatively large size may be adopted.

Further, there may be adopted edge-preserving filter processing which smoothes regions other than edges without blurring regions of a light emitting subject (the filter smoothes a region where a signal level difference between pixels is smaller than a certain reference value, and does not smooth a region where the signal level difference is larger than the reference value). For the detection of a light emitting subject, it is likely to presume whether the subject is emitting or not by comparing an infrared component with a visible light component.

By carrying out the smoothing processing on color difference signals Cb and Cr, the noise components included in the color difference signals Cb and Cr are faded, and thereby the S/N ratio of the color difference signals Cb and Cr can be improved.

Further, color space conversion section 43, as shown in Formulae (4), corrects color difference signals Crs and Cbs in response to ratio RT1 of luminance signal Yadd calculated by Formula (3) to luminance signal Y calculated by Formulae (2) (the first ratio: RT1=Yadd/Y), to obtain color difference signals Crm and Cbm.

$$Crm = Crs \times Yadd / Y, \text{ and}$$

$$Cbm = Cbs \times Yadd / Y \qquad \text{Formulae (4):}$$

In this way, by carrying out a mathematical operation using ratio RT1, the color signals are calculated. Specifically, by correcting color difference signals Crs and Cbs using ratio RT1, color difference signals and luminance signals in a color space which is subject to conversion can be calculated in good balance. By carrying out this processing, when color signals dR', dG', and dB' are calculated, brightness is not lost even in the case where luminance signal Yadd is larger than luminous signal Y, and further, the problem of excessive brightness can be prevented from occurring even in the case where luminance signal Yadd is smaller than luminous signal Y.

RGB color signal generation section 44 calculates color signals dR', dG', and dB' from luminous signal Yadd and color difference signals Crm and Cbm by carrying out an inverse conversion of Formulae (2). Specifically, the inverse conversion of Formulae (2) has only to be done with, in Formulae (2), Y being changed to Yadd, Cb and Cr being changed to Cbm and Crm respectively, and dR, dG and dB being changed to dR', dG' and dB' respectively.

Since color signals dR', dG', and dB' are calculated through the above-described processing, they become color signals having much higher accuracy compared to color signals dR, dG, and dB which were calculated by subtraction processing of image components Ye, R, IR, and W.

Figure 7:
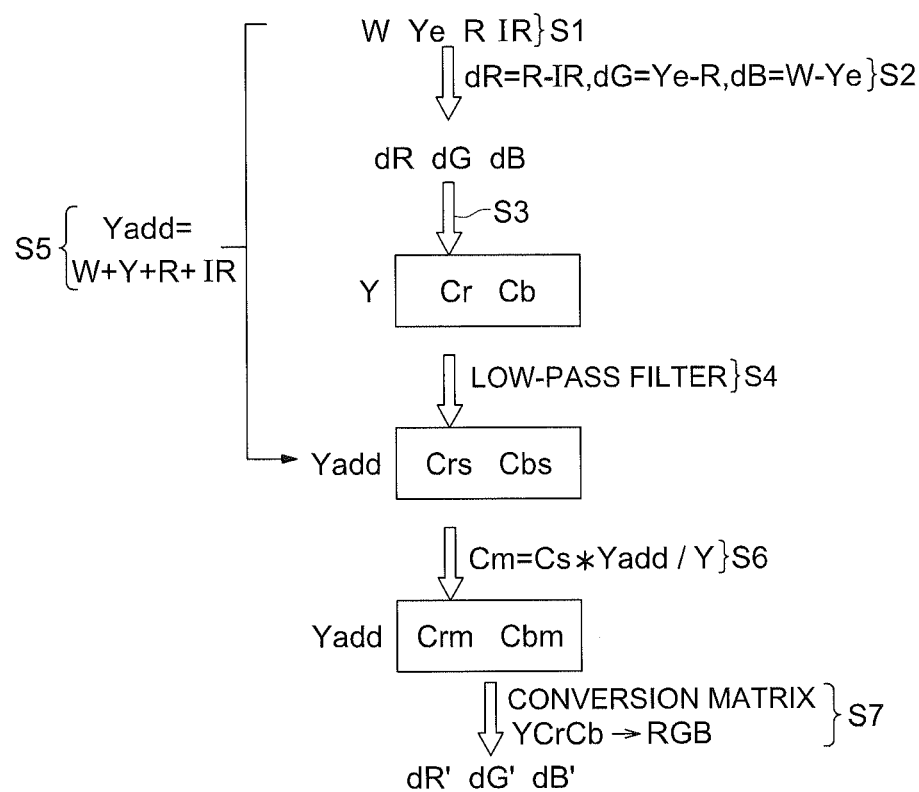
FIG. 7 is a flowchart showing actions of image input apparatus 1 of Embodiment 1.

Next, actions of image input apparatus 1 will be described. FIG. 7 is a flowchart showing actions of image input apparatus 1 of Embodiment 1. First, control section 5 allows imaging element 3 to take original image data of one frame. With this action, image components Ye, R, IR, and W are obtained (step S1).

Imaging element 3 takes imaging components Ye, R, IR, and W by Ye pixel, R pixel, IR pixel, and W pixel, respectively. In the case where image input apparatus 1 takes a dynamic image, control section 5 may allow imaging element 3 to take the original image data with a frame rate such as 30 fps, and 60 fps. In addition, in the case where image input apparatus 1 takes a still image, control section 5 may allow imaging element 3 to take the original image data when a user pushes a release button.

Subsequently, image components Ye, R, IR, and W are subjected to color interpolation processing by color interpolation section 41. Next, color signal generation section 42 carries out mathematical operations of dR=R−IR, dG=Ye−R, and dB=W−Ye, all of which are shown in Formulae (1), to calculate color signals dR, dG, and dB (step S2).

Next, color signal generation section 42 carries out mathematical operations of Y=0.3 dR+0.59 dG+0.11 dB, Cb=dB−Y, and Cr=dR−Y, all of which are shown in Formulae (2), to calculate luminance signal Y, color difference signals Cr and Cb (step S3).

Next, color space conversion section 43 carries out smoothing processing on color difference signals Cr and Cb to calculate color difference signals Crs and Cbs (step S4).

Next, color space conversion section 43 carries out calculation of Yadd=(¼)×(R+IR+W+Ye), which is shown in Formulae (1), to calculate luminance signal Yadd (step S5).

In the present embodiment, as shown in Formulae (1), luminance signal Yadd was calculated by adding R, IR, W, and Ye, but is not limited to it, and, for example, luminance signal Yadd may be calculated by performing a weighted addition as shown in Formula (1)'.

$$Yadd = \alpha \cdot R + \beta \cdot IR + \gamma \cdot W + \sigma \cdot Ye \quad \text{Formula (1)':}$$

wherein $\alpha$, $\beta$, $\gamma$, and $\sigma$ are weighting factors and $\alpha + \beta + \gamma + \sigma = 1$. As $\alpha$, $\beta$, $\gamma$, and $\sigma$, for example, prescribed values may be adopted.

Next, color space conversion section 43 carries out mathematical operations, which are shown in Formulae (4), to calculate color difference signals Crm and Cbm (step S6). In FIG. 7, color difference signals Crm and Cbm are merged into Cm, and color difference signals Crs and Cbs are merged into Cs.

Next, RGB color signal generation section 44 calculates color signals dR', dG', and dB' from luminous signal Yadd and color difference signals Crm and Cbm by carrying out an inverse conversion of Formulae (2).

As described above, according to image input apparatus 1, since luminous signal Yadd is calculated using Formulae (1), luminance signal Yadd having a high S/N ratio can be calculated even at night. Further, since color difference signals Cr and Cb are subjected to smoothing processing, color difference signals Crs and Cbs having a high S/N ratio can be calculated even at night.

Embodiment 2

Image input apparatus 1 according to Embodiment 2 is characterized in that the calculation method of color difference signals Crm and Cbm differs from that of Embodiment 1. The descriptions in the present embodiment which are identical to those in Embodiment 1 are omitted. Since the detailed constitutions of image processing section 4 are identical to those of Embodiment 1, FIG. 4 will be used.

In the present embodiment, color space conversion section 43, shown in FIG. 4, carries out a smoothing processing on luminance signal Y obtained by Formulae (2), to obtain luminance signal Ys. Also color space conversion section 43 carries out a smoothing processing on luminance signal Yadd obtained by Formula (3), to obtain luminance signal Yadds. As the smoothing processing, the cascade filter processing or a general filter processing have only to be adopted.

Then, color space conversion section 43, as shown in Formulae (5), corrects luminance signal Yadd in response to ratio RT2 of luminance signal Ys being subjected to the smoothing processing to luminance signal Yadds being subjected to the smoothing processing (the second ratio: RT2=Ys/Yadds), and then, calculates corrected luminance signal Yadd' as a luminance signal of a color space which is subject to conversion.

$$Yadd' = Yadd \times Ys/Yadds \quad \text{Formula (5):}$$

Since luminance signal Y is obtained by the color space conversion processing shown in Formulae (2), luminance signal Y becomes a signal which reproduces, with high accuracy, luminance of an image which is visually confirmed by human observation. On the other hand, since luminance signal Yadd is calculated by the addition processing shown in Formula (3), luminance signal Yadd becomes more difficult, compared to Formulae (2), to reproduce, with high accuracy, luminance of image which is visually confirmed by human observation. Therefore, as luminance signal Yadd becomes larger compared to luminance signal Ys, that is, as ratio RT2 becomes smaller than one, it may become impossible to reproduce, with high accuracy, luminance of image which is visually confirmed by human observation. Then, by obtaining luminance signal Yadd using Formula (5), luminance signal Yadd can be converted to a signal in which luminance of image which is visually confirmed by human observation is reproduced with high accuracy. In the above description, since Ys uses a value which is subjected to smoothing processing, the noise components are reduced. However, depending on the pattern of an image, there may be a case where unnatural elements are produced at edge portions.

Further, color space conversion section 43, as shown in Formulae (6), corrects color difference signals Crs and Cbs in response to the above-described ratio RT1 to calculate color difference signals Crm' and Cbm'. In this step, Yadd' is preferably used in place of Yadd.

$$Crm' = Crs \times Yadd'/Y, \text{ and}$$

$$Cbm' = Cbs \times Yadd'/Y \quad \text{Formulae (6):}$$

With this, the luminance signal and the color difference signal in the color space which is subject to conversion are well balanced, and thereby, calculation accuracy of color signals dR', dG', and dB' which will be generated by RGB color signal generating section 44 to be described can be improved.

Further, color space conversion section 43 compares intensity of infrared light with intensity of visible light, and in the case where the intensity of infrared light is stronger than that of visible light, the luminance signal of the color space may be calculated by performing a weighted addition of luminance signal Yadd and signal Yt in which image components Ye, R, IR, and W were used with no change, in order to minimize the weighting of luminance signal Yadd.

In this case, color space conversion section 43, in the case where the above ratio RT2 is smaller than threshold Th1 which shows that luminance signal Yadds is dominant, has only to judge that the intensity of infrared light is stronger than the intensity of visible light. Then, color space conversion section 43 has only to calculate luminance signal Yadd' by performing a weighted addition of luminance signal Yadd and signal Yt, in order to minimize the weighting of luminance signal Yadd as shown in Formula (7).

$$Yadd' = Yt \times (1 - Ys/Yadds) + Yadd \times (Ys/Yadds) \qquad \text{Formula (7):}$$

wherein Yt represents a signal in which any one of image components Ye, R, IR, and W is used with no change. Specifically, in the case of calculating luminance signal Yadd' of a certain pixel, if the aforesaid pixel corresponds to a W filter, a Ye filter, an R filter, and an IR filter, the Yt is set that Yt=W, Yt=Ye, Yt=R, and Yt=IR, respectively.

In ratio RT2, in the case where luminance signal Yadds is dominant, there is a possibility that luminance signal Yadd' significantly differs from luminance of an image which people see. Then, in the case where luminance signal Yadd' is large, luminance signal Yadd' can be converted into a signal which is much closer to luminance of an image which people see by calculating luminance signal Yadd' so that the ratio of signal Yt to luminance signal Yadd becomes larger.

In ratio RT2, in the case where luminance signal Yadds is dominant, since it indicates that infrared light is dominant, the difference of signal level due to subject colors among pixels of Ye, R, IR, and W can be ignored. Namely, it can be considered to be equal to the case of a monochrome sensor. Therefore, resolution (resolving power) can be maximized by dealing with each of pixels of Ye, R, ER, and W as an independent signal by not adding them.

Further, color space conversion section 43 may compare intensity of infrared light with intensity of visible light by using a difference between image component W and image component IR or the ratio between them. In this case, color space conversion section 43 has only to judge that the intensity of infrared light is stronger than the intensity of visible light when the ratio IR/W is larger than a prescribed value which is closer to one, and that the intensity of visible light is stronger than the intensity of infrared light when the ratio IR/W is smaller than a prescribed value which is closer to zero.

Further, color space conversion section 43 has only to judge that the intensity of infrared light is stronger than the intensity of visible light when W−IR is less than a prescribed value which is closer to zero, and that the intensity of visible light is greater than the intensity of infrared light when IR is less than a prescribed value which is closer to zero.

In addition, since the larger the value of IR/W or IR−W, the stronger the intensity of infrared light than the intensity of visible light, color space conversion section 43 may determine a weighting factor of signal Yt in response to a value of IR/W or IR−W, and may carry out a mathematical operation of Formula (7)' to calculate luminance signal Yadd'.

$$Yadd' = k \cdot Yt + Yadd \cdot (1-k) \qquad \text{Formula (7)':}$$

wherein k≤1, and k represents a weighting factor of a prescribed signal Yt in which as IR/W or IR−W becomes larger, the value becomes larger.

Next, RGB color signal generating section 44 calculates color signals dR', dG', and dB' from luminance signal Yadd' and color difference signals Crm' and Cbm' by carrying out an inverse conversion of Formulae (2).

Figure 8:
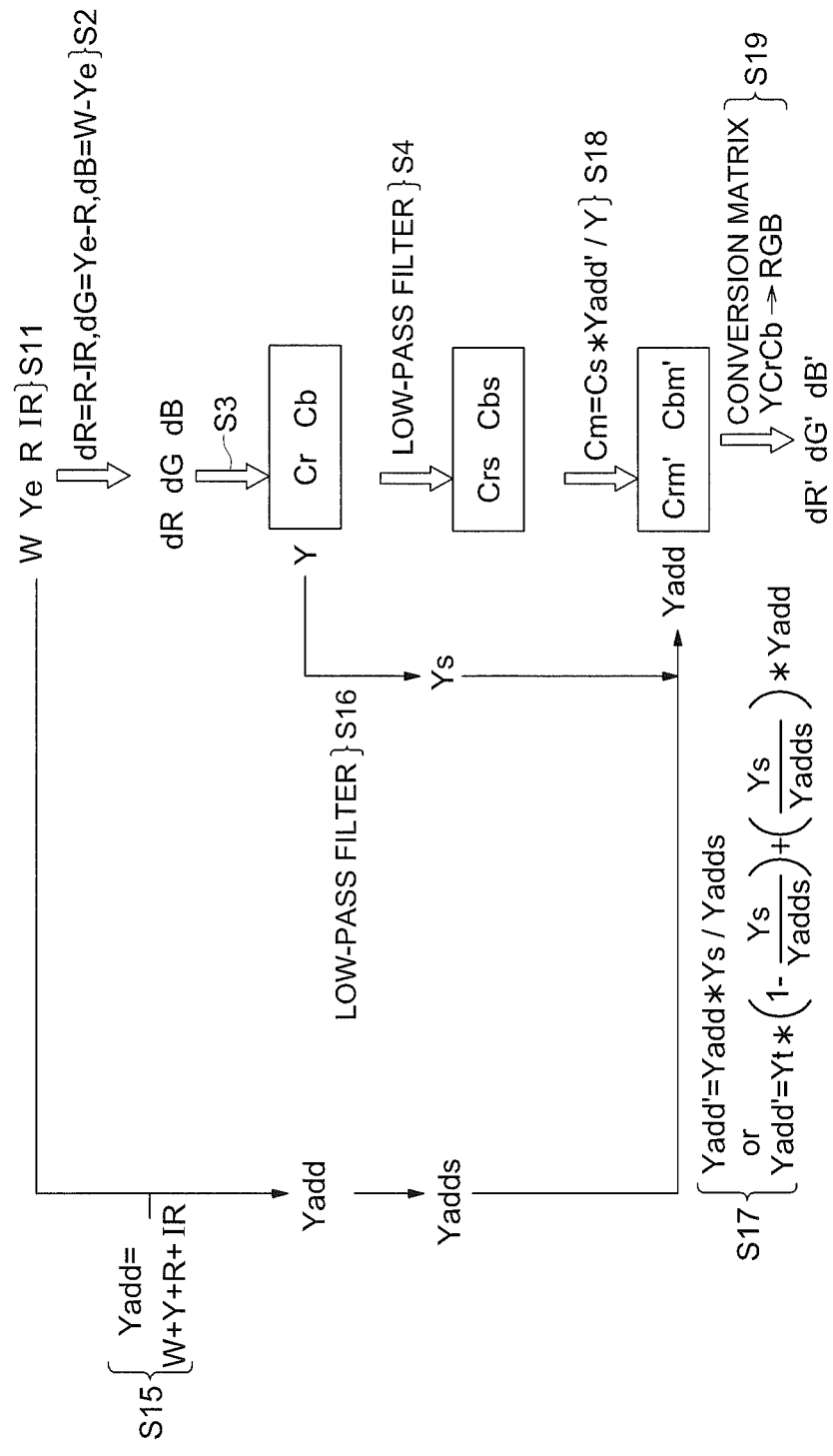
FIG. 8 is a flowchart showing actions of image input apparatus 1 of Embodiment 2.

Next, actions of image input apparatus 1 will be described. FIG. 8 is a flowchart showing actions of image input apparatus 1 of Embodiment 2.

Since steps S11 to S15 are identical to steps S1 to S5 shown in FIG. 7, descriptions of steps S11 to S15 are omitted. In step S16, color space conversion section 43 carries out a smoothing processing on luminance signal Yadd to calculate luminance signal Yadds, and at the same time, carries out a smoothing processing on luminance signal Y to calculate luminance signal Ys.

Next, color space conversion section 43, in the case where ratio RT2 is more than and equal to threshold Th1, calculates luminance signal Yadd' by a mathematical operation of Formula (5), and in the case where ratio RT2 is less than threshold Th1, calculates luminance signal Yadd' by a mathematical operation of Formula (7) (step S17).

Next, color space conversion section 43 obtains color difference signals Crm' and Cbm' by a mathematical operation of Formulae (6) (step S18). Next, RGB color signal generating section 44 carries out an inverse conversion of Formulae (2) to obtain color signals dR', dG', and dB' (step S19).

As described above, according to image input apparatus 1 of Embodiment 2, since luminance signal Yadd' is calculated using Formula (5) in the case where ratio RT2 is more than and equal to threshold Th1, and luminance signal Yadd' is calculated using Formula (7) in the case where ratio RT2 is less than threshold Th1, luminance signal which reproduces, with high accuracy, luminance of an image which is visually confirmed by human observation can be generated, in addition that the effects of Embodiment 1 can be obtained.

Further, since color difference signals Crs and Cbs are corrected using Formulae (6) to calculate color difference signals Crm' and Cbm', luminance signals and color difference signals in a color space which is subject to conversion can be calculated in good balance.

Color space conversion section 43 may corrects color difference signals Crm' and Cbm' so that color difference signals Crm' and Cbm' are lowered as the intensity of infrared light approaches the intensity of visible light.

In this case, color space conversion section 43 has only to calculate color difference signals Crm' and Cbm' by Formulae (8), instead of, for example, Formulae (6).

$$Crm' = Crs \times Yadd \times RT2/Y, \text{ and}$$

$$Cbm' = Cbs \times Yadd \times RT2/Y \qquad \text{Formulae (8):}$$

Namely, in the case where ratio RT2 is less than threshold Th1, luminance signal Yadd' becomes dominant over luminance signal Y, and then it is highly possible that pictures were taken at night, and thereby it is possible that color difference signal has not been calculated with high accuracy due to insufficient color information. Then, by adoption of Formulae (8), color difference signals are lowered, and color signals dR', dG', and dB' can be calculated so that influence of color difference signals in which calculation accuracy is low, and thereby color signals dR', dG', and dB' can be calculated without unpleasant visual sensation. In addition, color signals dR', dG', and dB' may be further color converted so as to be compatible with a standard display (for example, IEC 61966-2-1; sRGB standard).

It is not limited that formulae to be used are changed to Formulae (6) or (8) in comparing ratio RT2 with a threshold, but prescribed correction values, which make color difference signals Crs and Cbs smaller as ratio RT2 becomes smaller, are memorized, and color difference signals Crm' and Cbm' may be calculated using the above correction values. In this case, in Formulae (8), these correction values may be adopted instead of RT2.

In the above Embodiments 1 and 2, R and IR pixels were used as the second and third pixels, but it is not limited to them, and cyan (C) and magenta (M) pixels may be adopted as described above. Namely, the first to the fourth pixels may be used as Ye, M, C, and W pixels. In this case, shot noise is decreased, and thereby noise components included in original image data can be further reduced.

Also in this case, if image components obtained from Ye, C, M, and W pixels are set to be image components Ye, C, M, and W, RGB color signal generating section 42 has only to obtain color signals dR, dG, and dB by Formulae (9), instead of Formulae (1).

$$dR = W - C$$

$$dG = W - M, \text{ and}$$

$$dB = W - Ye \quad \text{Formulae (9):}$$

In addition, color space conversion section 43 has only to obtain luminance signal Yadd by Formula (10), instead of Formula (3).

$$Yadd = (\tfrac{1}{4}) \times (Ye + C + M + W) \quad \text{Formula (10):}$$

Spectral sensitivity characteristics of cyan (C) and magenta (M) are shown as in FIG. 10.

Figure 9:
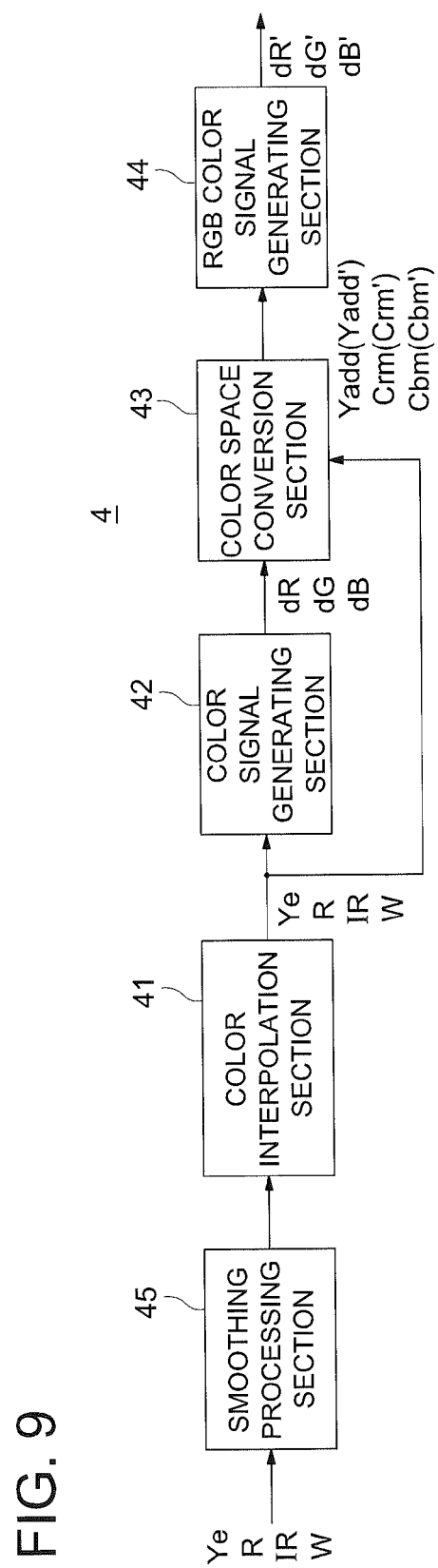
FIG. 9 is a block diagram of image processing section 4 with a smoothing processing section being arranged at the preceding stage of a color interpolation section.

In this calculation, a weighted addition in the similar way to Formula (1)' may be adopted, instead of simple averaging in such a way as Formula (10). Further, in the above Embodiments 1 and 2, color space conversion section 43 carried out the smoothing processing of color difference signals Cb and Cr, but the embodiment is not limited to it. Namely, the smoothing processing carried out by color space conversion section 43 may be omitted by arranging smoothing processing section 45 in the preceding step of color interpolation section 41 as shown in FIG. 9 and allowing smoothing processing section 45 to carry out smoothing processing of image components Ye, R, IR, and W.

Further, the smoothing processing may be carried out at any step as long as it is before calculation of color signals dR, sG, and dB.

In the above Embodiments 1 and 2, imaging element 3 is provided with four kinds of pixels, the first to the fourth pixels, but the embodiment is not limited to it, and the embodiment has only to be provided with at least three kinds of pixels.

In this case, as a sort of pixel which composes imaging element 3, there may be adopted such pixels that can form R, G, and B signals based on spectral sensitivity characteristics of each pixel.

SUMMARY OF EFFECTS

The following effects can be obtained by the above processing.

(1) Shot noise will be reduced due to filters exhibiting spectral sensitivity characteristics which receive as many photons as possible.

(2) In the color signal processing, noise is not emphasized since luminance components, which are visually prominent, are calculated only by addition.

(3) Though the calculation of color signals is carried out by subtraction resulting in increase in noise, an image is not blurred due to noise reduction by the smoothing processing as well as the visual characteristics of human eyes.

(4) Since brightness of an image can be matched to that seen by human eyes, reproduction of colors as if viewed in visible light can be achieved.

(5) In the case where only infrared light exists, resolution can be improved.

DESCRIPTION OF NUMERICAL DESIGNATIONS 1. an image input apparatus
2. a lens
3. an imaging element
4. an image processing section
5. a control section
41. a color interpolation section
42. a color signal generating section
43. a color space conversion section
44. a RGB color signal generating section
45. a smoothing processing section

The invention claimed is:

1. An image input apparatus comprising:
   an imaging element for taking original image data containing at least three kinds of original image components, arranged with at least three kinds of pixels having different spectral sensitivities,
   a color space conversion section which converts the original image data into a color space including luminance signals and chromaticity signals, and
   a color signal generating section which generates RGB color signals from the original image components, wherein the color space conversion section generates a second intensity signal by converting the RGB signals into the color space and calculates the chromaticity signals of the color space by carrying out a mathematical operation using a first ratio which represents a ratio of the first intensity signal to the second intensity signal;
   wherein the color space conversion section calculates a first intensity signal, which can be obtained by carrying out an addition processing of the original image components, as luminous signals of the color space.

2. The image input apparatus described in claim 1, wherein the color space conversion section carries out smoothing processing with respect to the original image components or chromaticity signals based on the original image components.

3. An image input apparatus comprising:
   an imaging element for taking original image data containing at least three kinds of original image components, arranged with at least three kinds of pixels having different spectral sensitivities;
   a color space conversion section which converts the original image data into a color space including luminance signals and chromaticity signals; and a color signal generating section which generates RGB color signals from the original image components, wherein the color space conversion section generates the second intensity signal by converting the RGB signals into the color space, corrects the first intensity signal by carrying out a mathematical operation using a second ratio which represents a ratio of the second intensity signal that was subjected to a smoothing processing to the first intensity signal that was subjected to a smoothing processing, and calculates the corrected first intensity signals as luminous signals of the color space;

wherein the color space conversion section calculates a first intensity signal, which can be obtained by carrying out an addition processing of the original image components, as luminous signals of the color space.

4. The image input apparatus described in claim 3, wherein the color space conversion section generates a second intensity signal by converting the RGB signals into the color space and calculates the chromaticity signals of the color space by carrying out a mathematical operation using a first ratio which represents a ratio of the first intensity signal to the second intensity signal.

5. An image input apparatus comprising:

an imaging element for taking original image data containing at least three kinds of original image components, arranged with at least three kinds of pixels having different spectral sensitivities, and a color space conversion section which converts the original image data into a color space including luminance signals and chromaticity signals, wherein the color space conversion section calculates a first intensity signal, which can be obtained by carrying out an addition processing of the original image components, as luminous signals of the color space;

wherein the original image data contains infrared image component, and wherein the color space conversion section compares an intensity of infrared light with an intensity of visible light based on the infrared image component, and performs a weighted addition of the first intensity signal and signals in which the original image components are used with no change so that weighting of the first intensity signal becomes small as the intensity of the infrared light increases, to calculate luminous signals of the color space.

6. The image input apparatus described in claim 1, further comprising;

a smoothing processing section which carries out a smoothing processing of the original image components;

a color interpolation section which interpolates missing pixel data of the original image components which were subjected to a smoothing processing by the smoothing processing section; and a color signal generating section which generates RGB color signals from the original image components, wherein the color signal generating section generates the RGB color signals from the original image components in which the missing pixel data were interpolated by the color interpolation section.

7. An image input apparatus comprising:

an imaging element for taking original image data containing at least three kinds of original image components, arranged with at least three kinds of pixels having different spectral sensitivities, and a color space conversion section which converts the original image data into a color space including luminance signals and chromaticity signals, wherein the color space conversion section calculates a first intensity signal, which can be obtained by carrying out an addition processing of the original image components, as luminous signals of the color space;

wherein in the imaging elements, unit pixel parts each containing a first pixel, a second pixel, a third pixel, and a fourth pixel, all of which have different spectral sensitivity from each other, are arranged in a matrix shape, and wherein when a visible wavelength region and an infrared wavelength region are referred to as a wavelength bands with sensitivity, the first pixel is provided with a first color filter which transmits light of the wavelength bands with sensitivity except for a blue region of the visible wavelength region, the second pixel is provided with a second color filter which transmits light of the wavelength bands with sensitivity except for the blue region and a green region of the visible wavelength region, the third pixel is provided with an infrared color filter which transmits light of the wavelength bands with sensitivity except for the visible wavelength region, and the fourth pixel is not provided with a filter.

8. The image input apparatus described in claim 1, wherein at least one of said at least three kinds of pixels having different spectral sensitivity of the imaging element has sensitivity in an infrared wavelength region.

9. The image input apparatus described in claim 1, wherein at least one of said at least three kinds of pixels having different spectral sensitivity of the imaging element has sensitivity only in an infrared wavelength region, and the first intensity signal is calculated only by carrying out addition processing of the original image components containing an infrared image component.

10. The image input apparatus described in claim 8, wherein the color space conversion section calculates so that the chromaticity signals of color space decrease as an intensity of infrared light becomes stronger than an intensity of visible light.

* * * * *